United States Patent
Verding

(12) 
(10) Patent No.: US 7,371,109 B2
(45) Date of Patent: May 13, 2008

(54) PATCH PANEL FOR MOUNTING ON A WALL OR IN A SUBRACK

(75) Inventor: Markus Verding, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 10/550,579

(22) PCT Filed: Feb. 27, 2004

(86) PCT No.: PCT/EP2004/001964

§ 371 (c)(1),
(2), (4) Date: Aug. 7, 2006

(87) PCT Pub. No.: WO2004/086777

PCT Pub. Date: Oct. 7, 2004

(65) Prior Publication Data

US 2006/0291144 A1    Dec. 28, 2006

(30) Foreign Application Priority Data

Mar. 25, 2003   (DE) ............................... 103 13 358

(51) Int. Cl.
*H01R 13/60*     (2006.01)

(52) U.S. Cl. ...................................................... 439/532

(58) Field of Classification Search ................ 439/532,
439/540.1, 713, 555, 571; 385/135; 375/257;
379/329

See application file for complete search history.

(56) References Cited

U.S. PATENT DOCUMENTS

| | | | |
|---|---|---|---|
| 5,035,645 A * | 7/1991 | Siemon et al. ............... | 439/532 |
| 5,497,444 A | 3/1996 | Wheeler | |
| 5,575,665 A | 11/1996 | Shramawick et al. | |
| 5,647,763 A | 7/1997 | Arnold et al. | |
| 6,945,414 B1 * | 9/2005 | Stevens et al. .......... | 211/94.01 |
| 2002/0055301 A1 * | 5/2002 | Gorman ...................... | 439/535 |
| 2002/0129574 A1 * | 9/2002 | Newhouse et al. ........... | 52/239 |

FOREIGN PATENT DOCUMENTS

| | | |
|---|---|---|
| DE | 37 37 049 A1 | 5/1989 |
| DE | 41 28 449 A1 | 7/1992 |
| DE | 201 17 759 U1 | 2/2002 |
| WO | WO 99/07163 | 2/1999 |

* cited by examiner

*Primary Examiner*—Chandrika Prasad

(57) ABSTRACT

The invention relates to a patch panel for mounting on a wall or in a subrack, comprising a housing part, which can be mounted on ends located on respective faces by means of angle brackets and which has a front cover provided in the form of a patch panel for routing data waiting on lines of an incoming cable to lines that can be connected via connecting devices on the front cover. An angle bracket is provided on each end and has a fork-type spring detent that can be inserted at the front and rear into guide slots, which are provided for insertably accommodating the fork-type spring detent on the ends that are situated on opposite sidewalls of the housing part, and the fork-type spring detent can be snapped in by means of corresponding detent means.

17 Claims, 5 Drawing Sheets

PATCH PANEL FOR MOUNTING ON A WALL OR IN A SUBRACK

CROSS REFERENCE TO RELATED APPLICATIONS

This application is the US National Stage of International Application No. PCT/EP2004/001964, filed Feb. 27, 2004 and claims the benefit thereof. The International Application claims the benefits of German application No. 10313358.5, filed Mar. 25, 2003. The International Application and the German application are incorporated by reference herein in their entirety.

FIELD OF THE INVENTION

The invention relates to a patch panel for mounting on a wall or in a subrack, with a housing part which can be mounted by means of angle brackets on its end faces and featuring a front panel which is embodied as a panel for routing data waiting on lines of an incoming cable to lines that can be connected to the front panel by connecting devices.

BACKGROUND OF THE INVENTION

A patch panel is a panel which is used for connecting, distributing and routing data connections. The front panel of a patch panel contains the connection jacks for outgoing cables. Each connecting jack in the tertiary area is assigned on the patch panel to its own plug-in connection. There are different embodiments of patch panels. There are patch panels in use which differ both as regards the number and also as regards the embodiment of the plug-in devices. As a rule the patch panel consists of rows of connection jacks of the same category. The connection jacks can for example be RJ connection jacks, BNC connection jacks or connections for glass fiber cables. As well as the main function, the routing of data, a patch panel facilitates troubleshooting when errors occur by allowing connection of monitoring and analysis devices.

Such a patch panel for routing of data waiting on lines of an incoming cable to connection devices to which users can be connected, is known for example from DE 197 34 422 C2. It consists of a mounting frame on which the connection devices are arranged and to which incoming cables are connected in a shielded housing. Each plug-in device is assigned its own shielding element which enables secure data routing.

In the housing installation of telecommunication devices patch panels are frequently accommodated in distribution frame cabinets in a distribution room. They are mounted in 19" subracks according to their pitch.

In addition there also are simple configurations in which it is too expensive to use a subrack. In these cases the patch panel is not mounted in a cabinet but on a wall instead. Both mounting options require a correspondingly embodied housing design or appropriately designed angle brackets. Different housing constructions or attachment brackets however involve increased expenditure, both as regards manufacturing costs and also as regards warehousing costs.

SUMMARY OF THE INVENTION

An object of the invention is to specify a patch panel so as to make it equally well suited for mounting on a wall and for mounting in a subrack and to make it easy to manufacture and assemble.

This object is achieved by the claims. The dependent claims relate to advantageous embodiments of the invention.

In accordance with the invention an angle bracket is provided on each end face featuring a fork-type spring detent which can be located into guide slots which are used to accept the fork-type spring detent embodied on the end faces on adjacent sidewalls, able to be inserted at the front and at the rear and able to be snapped in by means of corresponding detent means. The snap-in angle brackets make it possible to construct the housing in a way which is suitable both for wall mounting and for subrack mounting. Depending on the application the angle bracket is pushed into the housing on-site during assembly either from the front or the rear. When pushed on, the attachment bracket latches and is firmly attached to the housing once fully pushed on. Holding stocks of different housing versions or different attachment brackets is no longer necessary. Manufacturing at comparatively low cost is possible. The universal applicability also makes it possible for a patch panel previously mounted on a wall to be easily mounted in a subrack in the event of subsequent system expansion.

In a preferred embodiment the corresponding detent means are formed by latching hooks. These latching hooks are each formed on the arms of the fork-type spring detent and on the slot base of the guide slot. When the fork-type spring detent is introduced the arm is inserted into the slot until its latching hooks snap into the hooks in the guide slot. The latching hooks can be released from this snapped-in position again with the aid of a tool. Both angle bracket and housing are universally applicable.

A simple construction is produced if the guide slots are embodied in each case on a sidewall on the exterior of the housing between the front panel and the rear wall of the housing part to run all around the sidewall, with the latching hooks protruding into the guide slot from the slot base in the form of a wedge.

In a preferred embodiment a front pair of latching hooked is embodied spaced from the front and a rear pair of hooks spaced from the rear. This forms two separate snap-in devices for wall or subrack mounting. If the latching hooks of the fork-type spring detent are formed on the inside of the arms then in an inserted position the pair of hooks of the fork-type spring detent each engage in the rear pair or the front pair of hooks of the guide slot. The angle bracket can be used just as easily for mounting the patch panel on the wall and for mounting it in a subrack. For both types of mounting only stocks of one support need be maintained which is of advantage as regards logistics.

Pushing in the angle brackets is especially simple if the fork-type spring detent and/or the hooks of the guide slot are provided with a starting bevel. When the angle bracket is pushed on the two arms of the fork-type spring detent are displaced sideways. In the final mounting position of the angle bracket the two arms of the fork-type spring detent engage by spring pressure with the side walls of the housing part. The angle bracket is connected stably to the housing part. The two arms of the fork-type spring detent can be released from this engaged position by using a tool.

A housing part consisting of a front and a rear housing shell is preferable. With corresponding arrangements of the relevant pair of hooks on the rear or the front housing shell it is possible to remove the rear or the front housing shell. In this way access to a device within the patch panel is created without the panel having to be detached from the wall or removed from the subrack to gain such access.

Both housing shells can be connected to each other by a snap connection which is arranged in each case on the adjacent sides of the housing halves.

If the guide slots are arranged in a recessed section on the face of the housing this creates the constructive condition whereby the angle bracket in its inserted position is flush with the side walls or with the front panel. This is of advantage when a number of patch panels are mounted adjacent to one another since less mounting space is required. System expansion is a simple matter.

Preferably an embodiment of the patch panels in which the front housing shell features a preformed wall section at least one end which in the assembled state projects into the rear housing shell. This wall section can advantageously be embodied as a clamp for incoming cables. To this end the wall section features at least one cutout which can be provided with a nep contour. The incoming cable is clamped between wall section and rear wall and the strain on the connections to the jacks on the front panel is relieved.

If the housing part is made of injection-molded plastic, it has proved advantageous for the guide slots of the front or of the rear housing shell to be embodied in respect of the front panel to run vertically and with a rectangular cross section. The makes the injection-molding tool very easy to construct. The injection-molded parts can be easily deformed. Manufacturing in injection molding technology is especially favorable particularly with large volumes. It is however also conceivable for housing and angle brackets to be formed from punch bent steel parts.

When the panel is mounted in a subrack it is useful if the width of the front panel and the width of the angle bracket is equal to one height unit. This makes mounting in accordance with the pitch spacing possible.

The jumper panel on the front panel of the housing part can feature differently embodied connection devices. Connection jacks for electrical and/or optical cables can be provided on the jumpering panel.

BRIEF DESCRIPTION OF THE DRAWINGS

The invention will be explained below in greater detail with reference to the drawings. The Figures show.

DETAILED DESCRIPTION OF THE INVENTION

Figure 1:
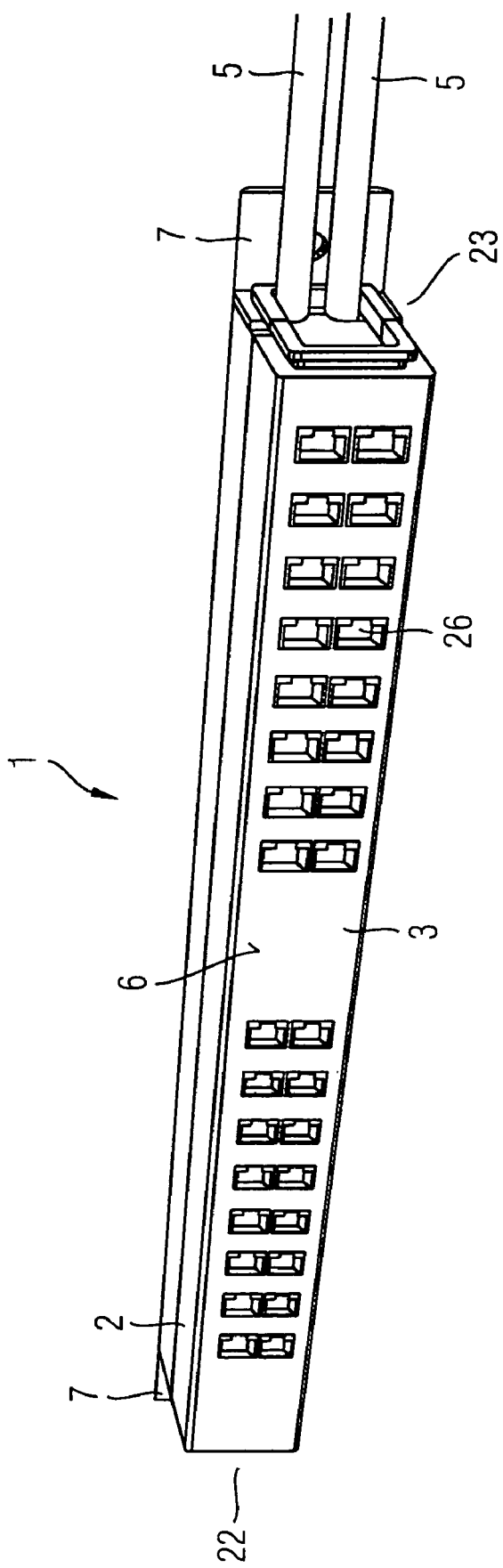
FIG. 1 the patch panel in accordance with the invention for wall mounting

FIG. 1 shows a perspective view of the inventive patch panel 1 which is set up for wall mounting. For routing of data waiting on lines in incoming cables 5 the front panel 3 of the patch panel 1 is embodied as a jumpering panel 6. The jumpering panel 6 consists of connection jacks 26 arranged in rows. the connection jacks are embodied in the exemplary embodiment as RJ-45 sockets into which RJ-45 plug-in devices of outgoing cables which are not shown in greater detail in FIG. 1 can be plugged. On each end face 22 and 23 of the housing part 2 there is a wall-mounting bracket 7 provided which is pushed on from the rear. On each angle bracket 7 holes for screws are provided, through which the patch panel can be mounted on a wall.

Figure 2:
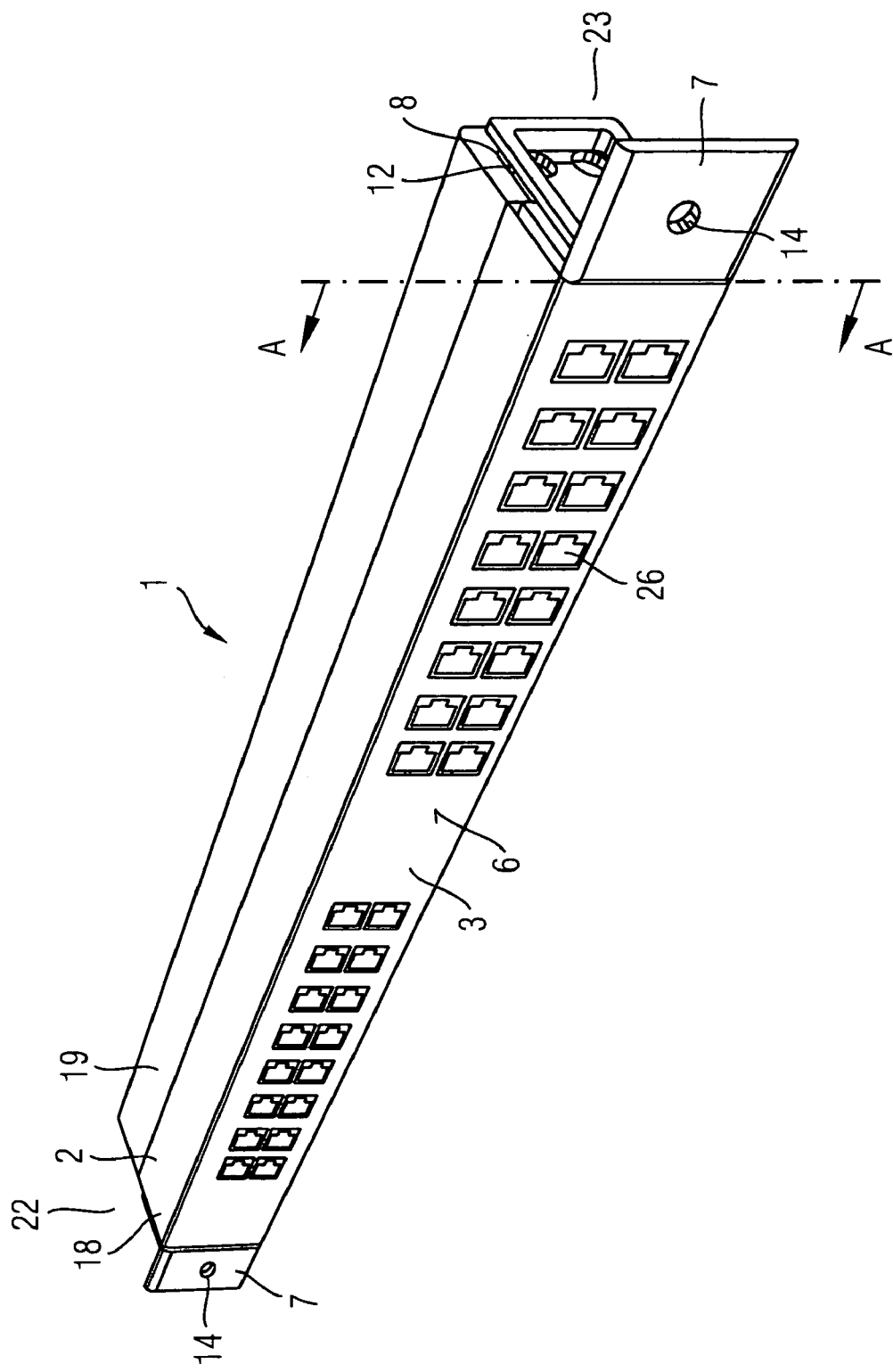
FIG. 2 the patch panel in accordance with the invention for subrack mounting.

For mounting in a subrack the angle brackets 7 are pushed on from the front, as shown in the perspective view of FIG. 2.

Figure 3:
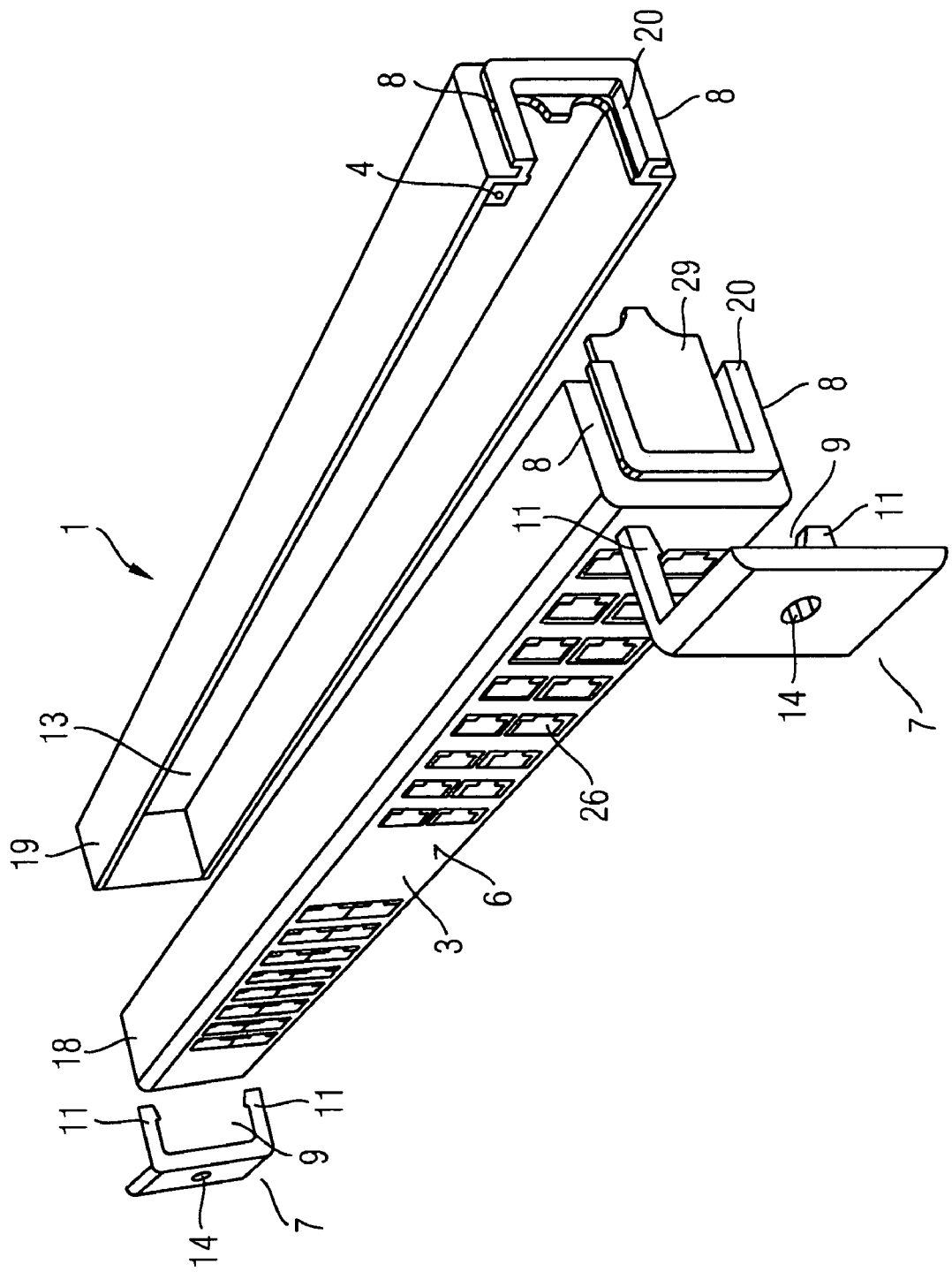
FIG. 3 the patch panel in accordance with the invention for subrack mounting, in an exploded view.

FIG. 3 shows the patch panel 1 in accordance with the invention in an exploded view before assembly for mounting in a subrack. The housing of the patch panel consists of a front housing shell 18 and a rear housing shell 19. A snap connection 4 is used to connect the two housing shells 18 and 19 to each other. On the end faces of the front housing shell 18 angle brackets 7 are provided. Each angle bracket 7 is embodied at a housing-side bracket part as a fork-type spring detent 9. The arms 11 of each fork-type spring detent 9 point in direction of the guide slots 8 which are formed to accept the fork-type spring detent 9 at a lug 20 on the housing shell 18. Also on the rear housing shell 19 there is a lug 20 embodied on the face side with guide slots 8.

Figure 4:
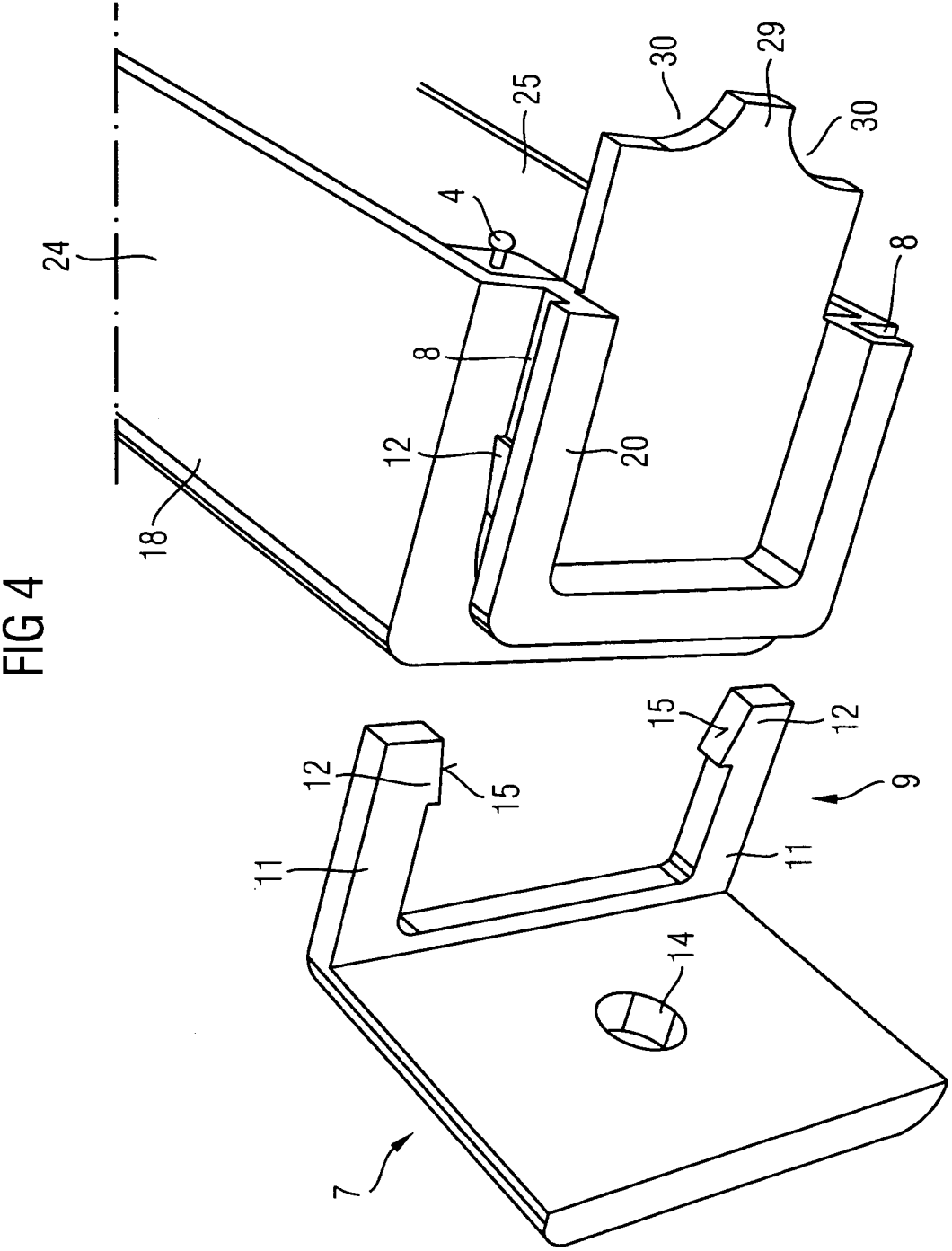
FIG. 4 a detailed view of one end face of the inventive patch panel.

To prepare the patch panel for mounting in a subrack each angle bracket 7 is inserted in the direction on the front panel 3 into the guide slots 8. As can be seen more clearly from the diagram in FIG. 4, each arm 11 is provided with latching hooks 12 which each have an starting bevel 15. On insertion this starting bevel 15 engages with a corresponding starting bevel of a latching hook in the guide slot 8. The effect of the insertion is that each arm 11 is deflected outwards until it latches into its final assembly position. The two angle brackets 7 can be attached to the front housing part 18 by this latching connection. After assembly with the rear housing shell 19 the patch panel 1 can be attached by screws into the holes 14 in a subrack.

Figure 5:
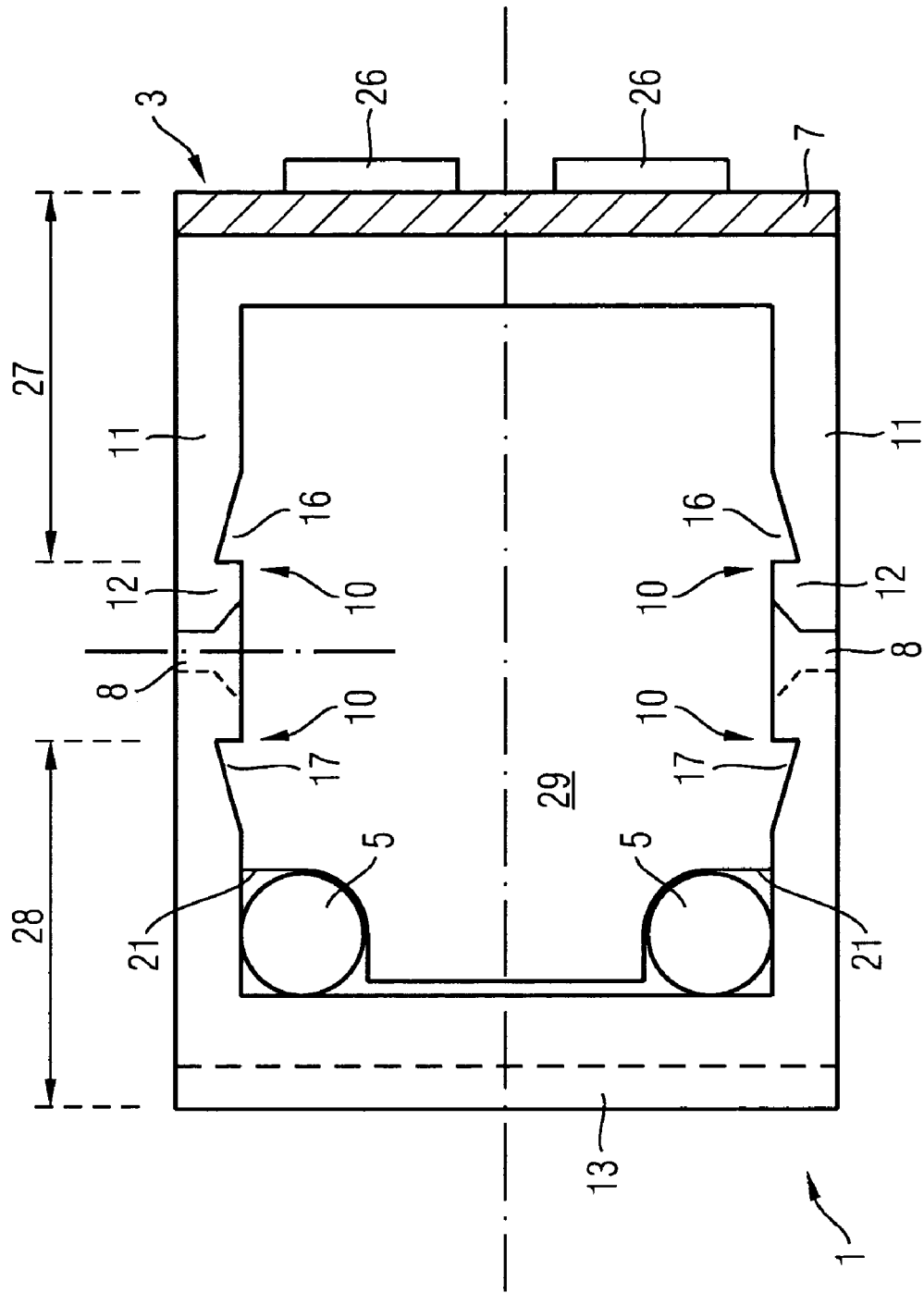
FIG. 5 cross section along the line A-A in FIG. 2.

FIG. 5 shows the inventive patch panel in a cross section along the line A-A of FIG. 2. The latching hooks 12 of the arms 11 are latched into a front pair of latching hooks 16. The pair of hooks 16 has a spacing 27 from the front panel 3 which is just as large as the spacing 28 between a rear wall pair of latching hooks 17 and the rear wall 13. This makes it possible for the angle brackets 7 to be inserted both from the front and also from the rear into the guide slots 8 and to engage in an end position with the relevant pair of latching hooks 16 or 17. In FIG. 5 the rear wall-side attachment position is shown by dashed lines. It can be seen very easily from the sectional drawing that in the assembled state the two housing shells 18 and 19 form a clamping device 21 for the cables 5 by means of the wall section 29. The wall section 29 is formed on the front housing part 18 and creates a strain relief for cable 5. The cable outlet is in a vertical position for wall mounting, preferably downwards, but can also be upwards.

The invention claimed is:

1. A patch panel for mounting on a wall or in a subrack, comprising:
    a front housing part;
    a rear housing part configured to be connected to the front housing part;
    at least two angle brackets configured to be connected to end faces of the front and rear housing parts for mounting the patch panel using the angle brackets, the angle brackets each including a spring detent shaped as a fork and having shanks;
    a front panel arranged at or included in the front housing part and embodied as a jumpering panel for routing data waiting on first lines of an incoming cable to second lines configured to be connected to the front panel using connection mechanisms; and
    a continuous guide slot arranged at the end faces and on adjacent sidewalls on an outer surface of the front and rear housing parts, the guide slots running around the front and rear housing parts when the first and second housing parts are connected, wherein the shanks are configured to be inserted into the guide slots by snapping in detent mechanisms included in the shanks and the continuous guide slot into the continuous guide slot from both a front housing side and a rear housing side.

2. The patch panel according to claim 1, wherein the patch panel can be mounted essentially level to a mounting surface if the shanks are inserted into the guide slots from the front housing side.

3. The patch panel according to claim 1, wherein the patch panel can be mounted upon a mounting surface if the shanks are inserted into the guide slots from the rear housing side.

4. The Patch panel according to claim 1, wherein the detent mechanisms include a latching hook formed on the shanks and on a slot base of the guide slot.

5. The Patch panel according to claim 4, wherein the latching hook is shaped as a wedge.

6. The Patch panel according to claim 4, wherein the latching hook includes front and rear pairs of latching hooks, the front pair of latching hooks arranged at a distance from a front panel outer surface, and the rear pair of latching hooks arranged at a distance from an outer surface of the rear housing part.

7. The Patch panel according to claim 6, wherein the latching hooks are formed on an inside of the shanks and engage into the front pair of latching hooks if the panel is mounted in a first assembly position.

8. The Patch panel according to claim 6, wherein the latching hooks are formed on an inside of the shanks and engage into the rear pair of latching hooks if the panel is mounted in a second assembly position.

9. The Patch panel according to claim 4, wherein the latching hook includes a bevel such that the shanks are deflected sideways when the spring detent is inserted and a pressure is exerted upon the sidewalls.

10. The Patch panel according to claim 1, wherein the two front and rear housing parts are connected by a snap-in connection.

11. The Patch panel according to claim 10, wherein the guide slot is arranged in a recessed lug relative to an outside contour of the front and rear housing parts, the lug included in the end faces of the front and rear housing parts.

12. The Patch panel according to claim 1, wherein a wall section is formed at an end of the front housing part, the wall section projecting into the rear housing part if the front and rear housing parts are connected.

13. The Patch panel according to claim 12, wherein the wall section includes cutouts such that a clamping device for the incoming cable is formed by the cutouts and the rear housing part if the front and rear housing parts are connected.

14. The Patch panel according to claim 1, wherein the guide slot runs perpendicularly relative to a plane defined by the front panel, the guide slot having a rectangular cross section.

15. The Patch panel according to claim 1, wherein a width of the front panel and a width of the angle brackets are the same.

16. The Patch panel according to claim 1, wherein the connection mechanisms are configured to connect electrical and/or optical lines.

17. The Patch panel according to claim 1, wherein the spring detent and the front and rear housing parts are manufactured from a polymer material using injection molding.

* * * * *